United States Patent
Cheong

(10) Patent No.: US 7,587,294 B2
(45) Date of Patent: Sep. 8, 2009

(54) SATA DEVICE HAVING SELF-TEST FUNCTION FOR OOB-SIGNALING

(75) Inventor: Woo-Seong Cheong, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 606 days.

(21) Appl. No.: 11/338,219

(22) Filed: Jan. 24, 2006

(65) Prior Publication Data

US 2006/0182229 A1    Aug. 17, 2006

(30) Foreign Application Priority Data

Jan. 31, 2005   (KR) ............. 10-2005-0008679

(51) Int. Cl.
  *G01R 27/28*   (2006.01)
  *G06F 11/00*   (2006.01)
(52) U.S. Cl. ........................ 702/117; 714/40
(58) Field of Classification Search .......... 702/117, 702/108, 118, 121; 455/68, 73; 710/1–3, 710/11, 20, 29, 100, 105, 106; 714/9, 43, 714/40; 713/300
See application file for complete search history.

(56) References Cited

U.S. PATENT DOCUMENTS

| | | | |
|---|---|---|---|
| 7,020,834 B2 * | 3/2006 | Chiang et al. ............. 714/799 |
| 7,039,064 B1 * | 5/2006 | Paulson et al. ............. 370/459 |
| 7,120,557 B2 * | 10/2006 | Schmitz et al. ............. 702/183 |
| 7,254,732 B2 * | 8/2007 | Bashford et al. ............. 713/324 |
| 7,424,628 B2 * | 9/2008 | Matsumoto et al. ......... 713/300 |
| 2003/0148801 A1 | 8/2003 | Deyring et al. ............. 455/701 |
| 2004/0120353 A1 | 6/2004 | Kim et al. ................... 370/503 |
| 2004/0215421 A1 | 10/2004 | Schmitz et al. ............. 702/183 |

OTHER PUBLICATIONS

Okawara, H., Serial ATA Testing with Analog Tester Resources, 2004 IEEE.*

* cited by examiner

*Primary Examiner*—Michael P. Nghiem
*Assistant Examiner*—Toan M Le
(74) *Attorney, Agent, or Firm*—F. Chau & Associates, LLC

(57) ABSTRACT

Disclosed is a SATA device having self-testing function with an OOB-signaling operation and a method of testing the same. The SATA device includes target and test-signaling controllers that sequentially generate and transceive control signals for the OOB-signaling operation. The SATA device also includes a test flow controller regulating the flow of the OOB-signaling control signals, and an analogue signal processor generating and transceiving analogue signals in correspondence with the OOB-signaling control signals. The analogue signals transmitted from the analogue signal processor return to the input terminal through a feedback loop.

16 Claims, 4 Drawing Sheets

US 7,587,294 B2

SATA DEVICE HAVING SELF-TEST FUNCTION FOR OOB-SIGNALING

CROSS-REFERENCE TO RELATED APPLICATIONS

This U.S. non-provisional patent application claims priority under 35 U.S.C. § 119 of Korean Patent Application 2005-08679 filed on Jan. 31, 2005, the entire contents of which are hereby incorporated by reference.

BACKGROUND

The present invention is concerned with electronic devices including SATA interfaces, which in particular relates to a SATA device with self-test function and method of testing the same.

In the environment of a serial advanced technology attachment (SATA) interface, it conducts an out-of-band (OOB) signaling operation in several cases of power-on sequence modes for establishing smooth communication links and a power saving modes. During such a OOB-signaling scheme, signals are transmitted by means of intervals of on/off periods and the number of burst signals, not directly using signals with physical speed such as 1.5 Gbps, 3 Gbps, or 6 Gbps.

FIG. 1 is a block diagram schematically illustrating a general SATA device with host and device platforms. FIG. 2 is a block diagram illustrating the feature of transceiving control signals at the host and device platforms of the SATA device by the conventional art. Referring to FIGS. 1 and 2, the host platform 20 has a host application system 21, a host controller 22, and a SATA analogue circuit 23. The device platform 10 has a device application system 11, a device controller 12, and a SATA analogue circuit 13. The host platform 20 and the device platform 10 are connected to each other through a SATA cable.

A SATA transceiving condition through the OOB-signaling scheme is initialized as follows. The host controller 22 of the host platform 20 sends a control signal COMRESET to the SATA analogue circuit 23. The SATA analogue circuit 23 transmits the control signal COMRESET to the device platform 10 by way of the SATA cable 30 in the form of analogue. The device controller 12 of the device platform 10 confirms the control signal COMRESET that is received through the SATA analogue circuit 13, and then applies a control signal COMINIT to the SATA analogue circuit 13. The SAYA analogue circuit 13 transmits the control signal COMINIT to the host platform 20 by way of the SATA cable 30 in the form of analogue. The host controller 22 of the host platform 20 confirms the control signal COMEINIT received thereto, and then transmits a control signal COMWAKE (hereinafter, referred to as waking signal) to the device platform 10. The device controller 12 of the device platform 10 confirms the control signal COMWAKE, and then transmits the waking signal COMWAKE to the host platform 20. As same as such, after exchanging a primitive signal ALIGN between the device platform 10 and the host platform 20 in order to accord a communication frequency (or data rate) therebetween, the initialization for the SATA transceiving condition is completed by generating each standby signal Phy_Ready.

The control signal COMREST (i.e., reset signal) is always generated from the host platform 20, resetting the device platform 10. The control signal COMINIT (i.e., initializing signal) is generated always from the device platform 10, requesting for initializing a communication condition. The initializing signal COMINIT is the same with the reset signal COMRESET in electrical dimension. The waking signal COMWAKE and the primitive signal ALIGN are all generated from the host platform 20 and the device platform 10.

In testing such an OOB-signaling scheme, it needs to apply burst signals, which are generated by the standard of SATA specification, to a test target, and to determine whether an OOB-signaling operation has been properly completed. Thus, it is required with external test equipment including an analogue circuit (i.e., physical layer) that is able to carry out serial communication with a test target.

SUMMARY OF THE INVENTION

The present invention is directed to a SATA device having a self-test function without external test equipment and a method of testing the same.

An aspect of the invention is.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of invention to those skilled in the art. Like numerals refer to like elements throughout the specification.

Hereinafter, it will be described about an exemplary embodiment of the present invention in conjunction with the accompanying drawings.

Figure 1:
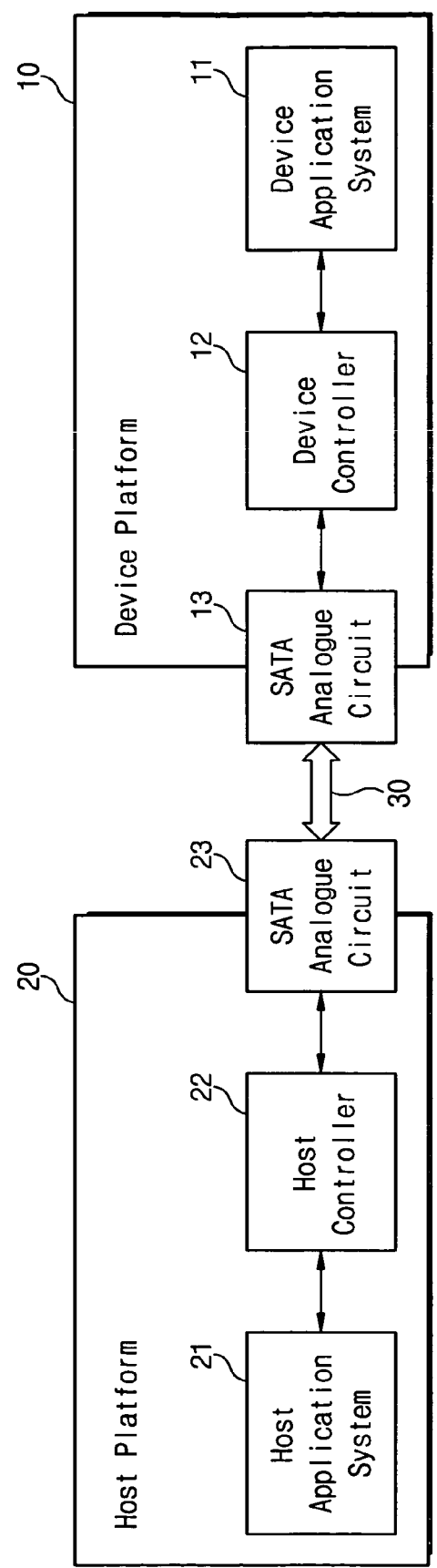
FIG. 1 is a block diagram schematically illustrating a general SATA device with host and device platforms.
Figure 2:
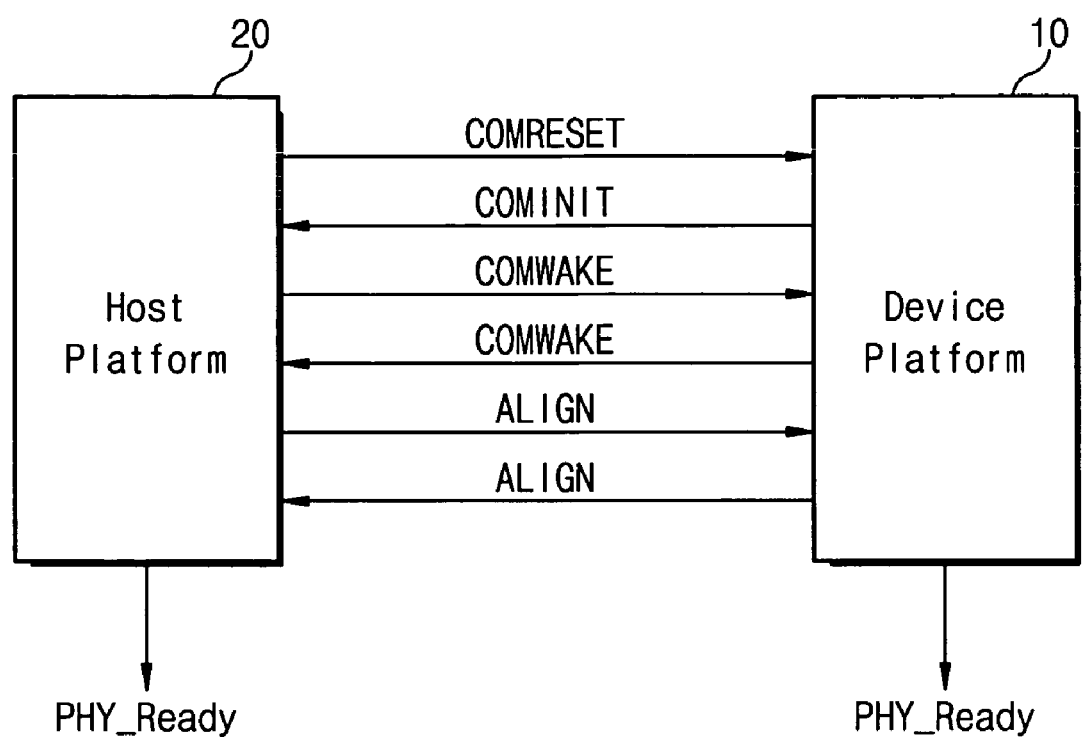
FIG. 2 is a block diagram illustrating the feature of transceiving control signals at the host and device platforms of the SATA device by the conventional art.
Figure 3:
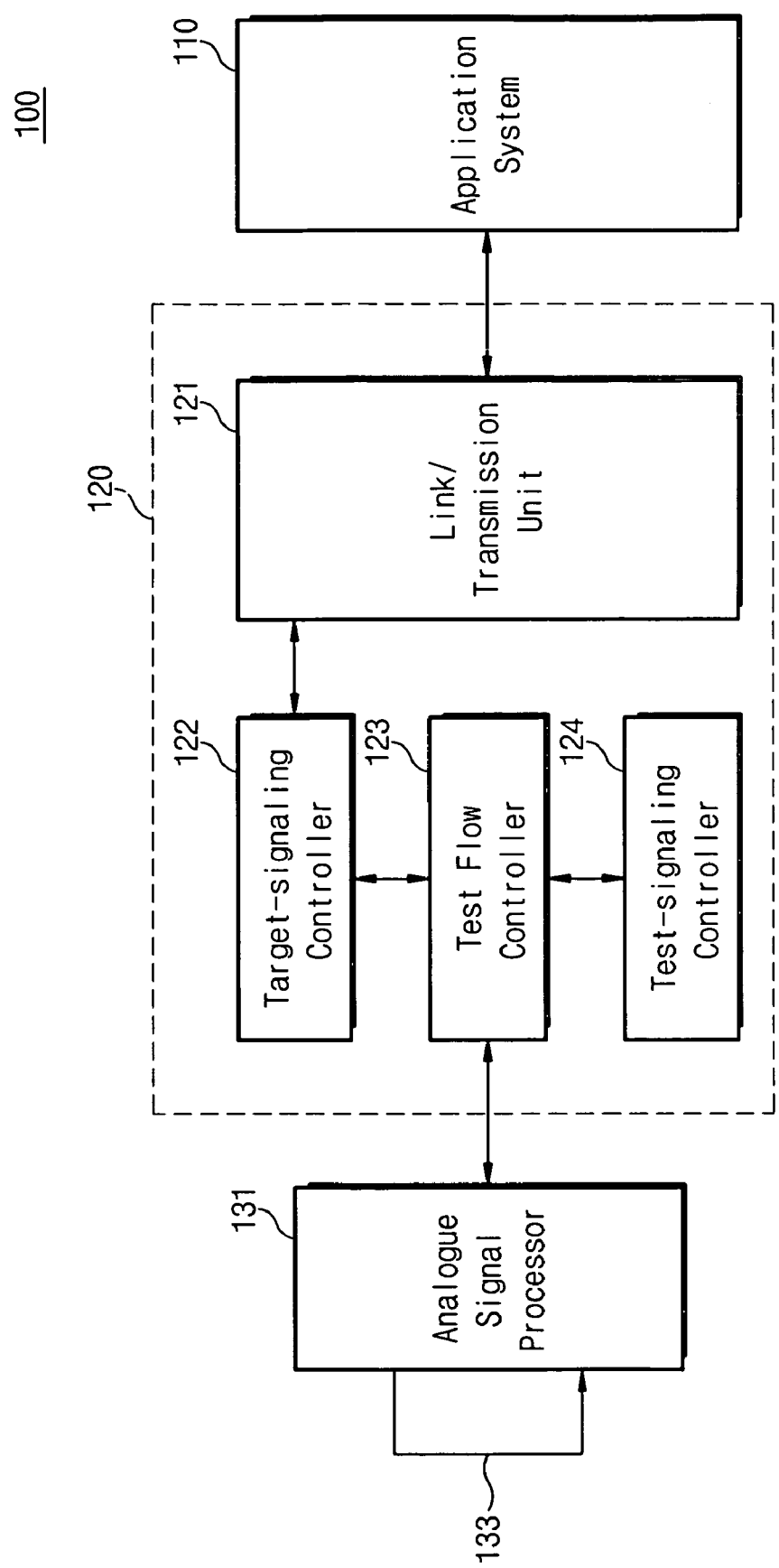
FIG. 3 is a block diagram of a SATA device in accordance with an embodiment of the invention.

FIG. 3 is a block diagram of a SATA device in accordance with an embodiment of the invention. Referring to FIG. 3, the SATA device 100 is comprised of an analogue signal processor 131, a SATA controller 120, and an application system 110. The SATA controller 120 forms data, which are transferred from the application system 110, into packets and transmits the data packets through the analogue signal processor 131, or abstracts required data in data packets transferred from the analogue signal processor 131 and transmits the abstracted data to the application system 110.

The analogue signal processor 131 generates analogue signals in compliance with the SATA controller 120 and then transmits the analogue signals to an external device, or receives analogue signals from an external device and then transfers the received analogue signals to the SATA controller 120 after processing the received analogue signals without noises.

The SATA controller 120 is comprised of a target OOB-signaling controller 122, a test flow controller 123, a test-signaling controller 124, and a link/transmission unit 121.

In a normal mode prosecuting a regular operation, the link/transmission unit 121 transforms information data, which are transferred from the application system, into the structure of frame information (hereinafter, referred to as "FIS"). After then, the link/transmission unit 121 generates control data in accordance with the protocol thereof and transmits the control data to the target-signaling controller 122. Or, the link/transmission unit 121 abstracts the FIS from data received from the target-signaling controller 122 and then transfers the abstracted data to the application system. The data transception by the SATA device according to the invention is subjected to 1.0 Revision of the Serial ATA II: Electrical Specification.

Figure 4:
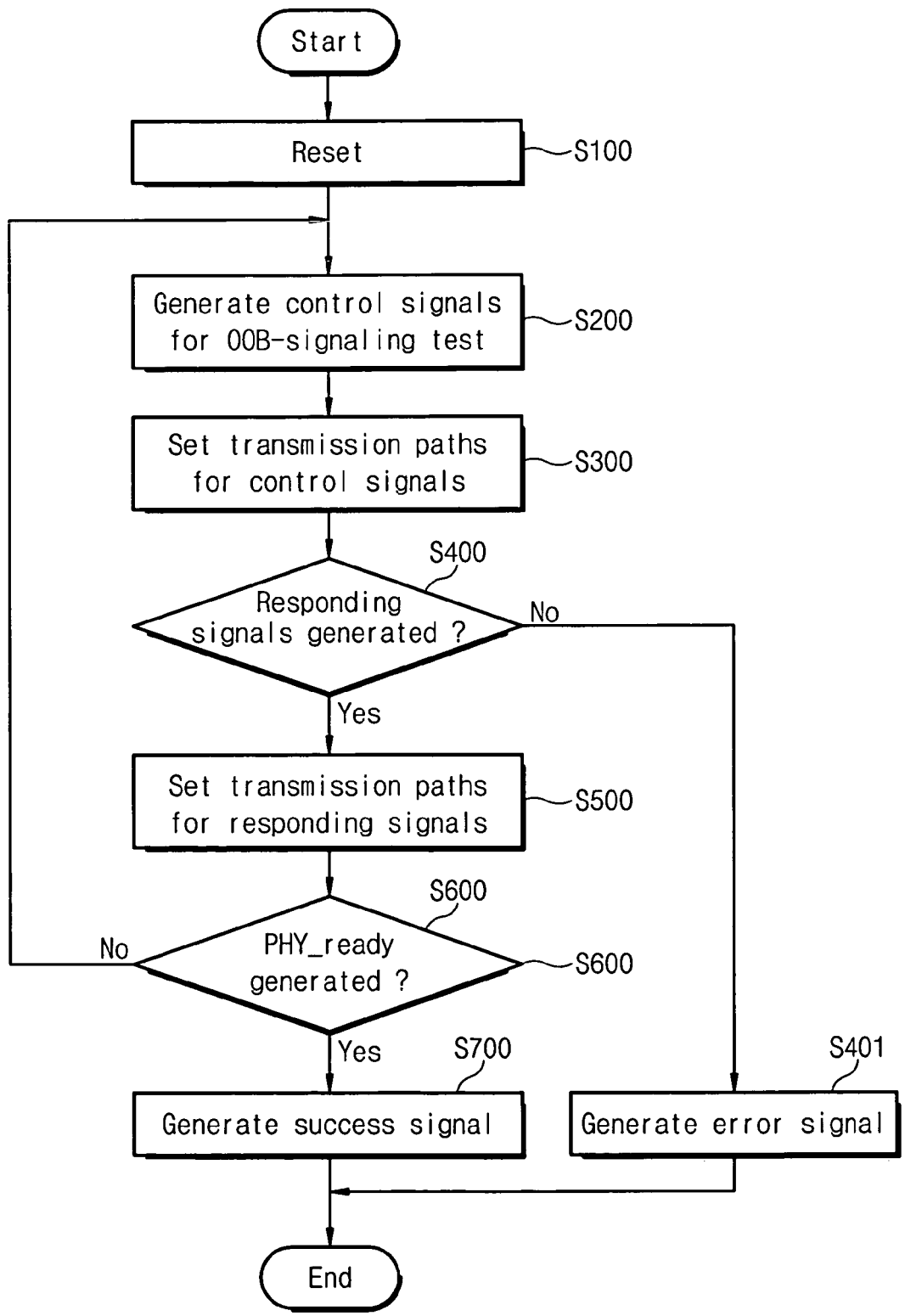
FIG. 4 is a flow chart showing a procedure of testing the SATA device in accordance with of the invention.

FIG. 4 is a flow chart showing a procedure of testing the SATA device in accordance with of the invention. Now, with referent to FIGS. 3 and 4, it will be described in detail about the feature of the OOB-signaling test with the device platform in the SATA device according to the embodiment of the invention.

Referring to FIG. 3, as the device platform is a test target, the target-signaling controller 122 is composed of a device SATA digital circuit. The test-signaling controller 124 is composed of a host SATA digital circuit. The test flow controller 123 regulates the flow of signals and data among the test-signaling controller 124, the target-signaling controller 122, and the analogue signal processor 131.

Referring to FIG. 4, in a test mode, the test-signaling controller 123 interrupts signals irrelevant to the OOB-signaling operation, and resets the target and test-signaling controller 122 and 124 at the same time or in sequence (step S100). The test-signaling controller 124 generates and transfers the reset signal COMRESET to the test flow controller 123 (step S200). The test flow controller 123 transfers the reset signal COMRESET to the analogue signal processor 131. Further, the test flow controller 123 transfers the reset signal COMRESET, which returns to the analogue signal processor 131 through a feedback loop 133 after output from the analogue signal processor 131, to the target-signaling controller 122 (step S300). In this case, it is available for the feedback loop 133 to be used with a general feedback circuit in order to return the transmitted signals to the analogue signal processor 131.

The target signaling controller 122 generates the initializing signal COMINIT as a responding signal after confirming whether the reset signal COMRESET is valid. The initializing signal COMINIT is transferred to the analogue signal processor 131 by way of the test flow controller 123. During this, the test flow controller 123 enables the initializing signal COMINIT, which returns to the analogue signal processor 131 through the feedback loop 133 after transmitted from the analogue signal processor 131, to be transferred to the test-signaling controller 124 (step S500).

The test-signaling controller 124 generates the waking signal COMWAKE when it determines the initializing signal COMINIT is valid. The waking signal COMWAKE returns to the analogue signal processor 131 through the feedback loop 133 after transmitted from the analogue signal processor 131, as like the reset signal COMRESET. After then, the waking signal COMWAKE is transferred to the target-signaling controller 122. It is also available for the feedback loop 133 to be used with a general feedback circuit in order to return the transmitted signals to the analogue signal processor 131.

The target-signaling controller 122 activates the waking signal COMWAKE from determining whether the waking signal COMWAKE of the test-signaling controller 124 is valid. In this case, if in the absence of the waking signal COMWAKE for a predetermined time, the test operation is suspended (step S401).

The waking signal COMWAKE from the target-signaling controller 122 is also transferred to the test-signaling controller 124, as like the initializing signal COMINIT. While transceiving the waking signal COMWAKE, the test flow controller 123 regulates the flow of signals by switching interconnections among the analogue signal processor 131, the target-signaling controller 122, and the test-signaling controller 124.

Thereafter, the alignment primitive signal ALIGN is generated from the test-signaling controller 124 and then, as like the reset signal COERESET, transferred to the target-signaling controller 122. Further, the target-signaling controller 122, if it determines that the alignment primitive signal ALIGN from the test-signaling controller 124 is valid, generates and transfers the alignment primitive signal ALIGN to the test-signaling controller 124 through the same way with the initializing signal COMINIT.

If the transception with the alignment primitive signal ALIGN has been completed in normal, the test-signaling controller 124 and the target-signaling controller 122 generate and transfers a standby signal PHY-ready to the test flow controller in sequence (step S600). In response to the standby signal PHY-ready, the test flow controller 123 generates a signal that informs of successful execution of the OOB-signaling test (step S700).

If the OOB-signaling test operation is not conducted successfully, such that valid signals are hard to be transferred to the test flow controller 123 in predetermined times step by step, it is regarded as an erroneous condition and then the test operation is interrupted (step S401).

Next, it will be described in detail about the feature of the OOB-signaling test with the host platform in the SATA device according to the embodiment of the invention.

Returning to FIG. 3, as the host platform is a test target, the target-signaling controller 122 is composed of a host SATA digital circuit. The test-signaling controller 124 is composed of a device SATA digital circuit.

Returning to FIG. 4, in a test mode, the test-signaling controller 123 interrupts signals irrelevant to the OOB-signaling operation, and resets the target and test-signaling controller 122 and 124 at the same time or in sequence (step S1000).

The test-signaling controller 124 generates and transfers the reset signal COMRESET to the test flow controller 123 (step S200). The test flow controller 123 transfers the reset signal COMRESET to the analogue signal processor 131. Further, the test flow controller 123 transfers the reset signal COMRESET, which returns to the analogue signal processor 131 through a feedback loop 133 after output from the analogue signal processor 131, to the test-signaling controller 124 (step S300).

The target signaling controller 122 generates the initializing signal COMINIT if it determines the reset signal COMRESET is valid. The initializing signal COMINIT is transferred to the test flow controller 123 (step S400). During this, the test flow controller 123 enables the initializing signal COMINIT, which returns to the analogue signal processor 131 by way of the feedback loop 133 after passing through the test flow controller 123 and the analogue signal processor 131, to be transferred to the target-signaling controller 122 (step S500).

The target-signaling controller 122 generates the waking signal COMWAKE when it determines the initializing signal COMINIT is valid. The waking signal COMWAKE is transferred to the test-signaling controller 124 by way of the test flow controller 123 and the analogue signal processor 131, as like the reset signal COMRESET.

The test-signaling controller 124 activates the waking signal COMWAKE from determining whether the waking signal COMWAKE of the target-signaling controller 122 is valid. In this case, in the absence of the waking signal COMWAKE for a predetermined time, the test operation is suspended (step S401). The waking signal COMWAKE of the test-signaling controller 124 is transferred to the target-signaling controller 122 again.

Thereafter, the alignment primitive signal ALIGN is generated from the target-signaling controller 122 and then, as like the reset signal COERESET, transferred to the test-signaling controller 124. Further, the test-signaling controller 124, if it determines that the alignment primitive signal ALIGN from the target-signaling controller 122 is valid, generates and transfers the alignment primitive signal ALIGN to the target-signaling controller 122 through the same way with the initializing signal COMINIT.

If the transception with the alignment primitive signal ALIGN has been completed in normal, the test-signaling controller 124 and the target-signaling controller 122 generate and transfers a standby signal PHY-ready to the test flow controller in sequence (step S600). In response to the standby signal PHY-ready, the test flow controller 123 generates a signal that informs of successful execution of the OOB-signaling test (step S700).

As also, in this case, if valid signals are hard to be transferred to the test flow controller 123 in predetermined times step by step, it is regarded as an erroneous condition and then the test operation is interrupted (step S401).

Although the present invention has been described in connection with the embodiment of the present invention illustrated in the accompanying drawings, it is not limited thereto. It will be apparent to those skilled in the art that various substitution, modifications and changes may be thereto without departing from the scope and spirit of the invention.

As described above, the invention is able to prosecute the OOB-signaling test operation for an electronic device by means of an embedded module such a SATA controller, by itself, without using any specific test equipment. As a result, it reduces a cost for the OOB-signaling test and enhances a yield with reliability.

What is claimed is:

1. A serial advanced technology attachment (SATA) device comprising:
   an application system;
   an analogue signal processor; and
   a SATA controller forming data transferred from the application system into a plurality of data packets and transmitting the plurality of data packets into the analogue signal processor, or abstracting required data in data packets and transmitting the abstracted data to the application system;
   wherein the SATA controller comprising:
      a target-signaling controller generating control signals for an out-of-band (OOB) signaling test in sequence;
      a test-signaling controller generating control signals for the OOB-signaling test together with the target-signaling controller in sequence; and
      a test flow controller regulating transception flow of control signals transceived between the target signaling controller and the test-signaling controller during the OOB-signaling test;
   wherein the analogue signal processor generating analogue signals in correspondence with the control signals of the test flow controller, transforming received analogue signals into the control signals for the OOB-signaling test, and transferring the control signals to the test flow controller.

2. The SATA device as set forth in claim 1, wherein the analogue signal processor is configured to re-accept the analogue signals that have been transmitted.

3. The SATA device as set forth in claim 2, wherein the analogue signal processor is configured to re-accept the transmitted analogue signals by way of a feedback loop.

4. The SATA device as set forth in claim 1, wherein the control signals generated from the test-signaling controller for the OOB-signaling test include a reset signal, a waking signal, an alignment primitive signal, and a standby signal.

5. The SATA device as set forth in claim 4, wherein the control signals generated from the target-signaling controller for the OOB-signaling test include an initializing signal, the waking signal, the alignment primitive signal, and the standby signal.

6. The SATA device as set forth in claim 5, wherein the test flow controller interrupts the OOB-signaling test and generates an error signal in the absence of the control signals for the OOB-signaling test during a predetermined time.

7. The SATA device as set forth in claim 6, wherein the test flow controller generates a success signal when all the control signals for the OOB-signaling test are generated in sequence.

8. The SATA device as set forth in claim 1, wherein the control signals generated from the test-signaling controller for the OOB-signaling test include an initializing signal, a waking signal, an alignment primitive signal, and a standby signal.

9. The SATA device as set forth in claim 8, wherein the control signals generated from the target-signaling controller for the OOB-signaling test include a reset signal, the waking signal, the alignment primitive signal, and the standby signal.

10. The SATA device as set forth in claim 9, wherein the test flow controller interrupts the OOB-signaling test and generates an error signal in the absence of the control signals for the OOB-signaling test during a predetermined time.

11. The SATA device as set forth in claim 10, wherein the test flow controller generates a success signal when the control signals for the OOB-signaling test are generated in sequence.

12. A method of testing a serial advanced technology attachment (SATA) device, comprising the steps of:
   receiving data transferred from an application system;
   forming the received data into a plurality of data packets and transmitting the plurality of data packets into an analogue signal processor or abstracting required data in the data packets and transmitting the abstracted data to the application system, further comprising:
      generating control signals for an out-of-band (OOB) signaling test;
      setting transmission paths for the control signals;
      determining whether there are responding signals in correspondence with the control signals;
      setting transmission paths for the responding signals in the presence of the responding signals, while generating an error signal in the absence of the responding signals;

determining whether there is generation of a standby signal; and generating a success signal in the presence of the standby signal, while activating the control signals for the OOB-signaling test in the absence of the standby signal.

13. The method as set forth in claim 12, wherein the step of generating the control signals generated for the OOB-signaling test includes generating a reset signal, a waking signal, an alignment primitive signal, and the standby signal.

14. The method as set forth in claim 13, wherein the step of determining the generation with the responding signals finds whether there are generations of an initializing signal, the waking signal, the alignment primitive signal, and the standby signal.

15. The method as set forth in claim 12, wherein the step of generating the control signals generated for the OOB-signaling test includes generating an initializing signal, a waking signal, an alignment primitive signal, and the standby signal.

16. The method as set forth in claim 15, wherein the step of determining the generation with the responding signals finds whether there are generations of a reset signal, the waking signal, the alignment primitive signal, and the standby signal.

* * * * *